United States Patent
Bembas

[11] Patent Number: 6,082,561
[45] Date of Patent: Jul. 4, 2000

[54] PORTABLE JIB CRANE FOR PANEL TRUCKS

[75] Inventor: Lawrence Bembas, Rochester Hills, Mich.

[73] Assignee: Lawrence G. Bembas, Rochester Hills, Mich.

[21] Appl. No.: 09/206,426

[22] Filed: Dec. 7, 1998

[51] Int. Cl.⁷ ........................................ B60P 1/54
[52] U.S. Cl. ................. 212/180; 212/225; 212/253; 414/543
[58] Field of Search .................... 212/180, 225, 212/253; 414/542, 543

[56] References Cited

U.S. PATENT DOCUMENTS

| | | |
|---|---|---|
| 2,335,522 | 11/1943 | Le Tourneau ........................ 212/225 |
| 2,862,628 | 12/1958 | Coates et al. ........................ 212/292 |
| 2,877,905 | 3/1959 | Wiley ........................ 212/253 |
| 3,572,513 | 3/1971 | Tantilinger et al. ........................ 414/542 |
| 3,842,715 | 10/1974 | Worthington ........................ 414/542 |
| 5,429,253 | 7/1995 | McNett ........................ 212/253 |
| 5,743,702 | 4/1998 | Gunderson ........................ 414/542 |

*Primary Examiner*—Thomas J. Brahan

[57] ABSTRACT

Disclosed is a novel jib crane for panel trucks, or vans wherein the crane pivots along a common axis between opposing fixed bearing mounts. In practice, one attaches a lifting apparatus ratus to a trolley of the jib. A payload is hoisted off the floor of the vehicle, and after pulling the locking pin, the jib/mast is manually rotated until the payload is clear of the vehicle. The payload is then lowered to the ground.

8 Claims, 3 Drawing Sheets

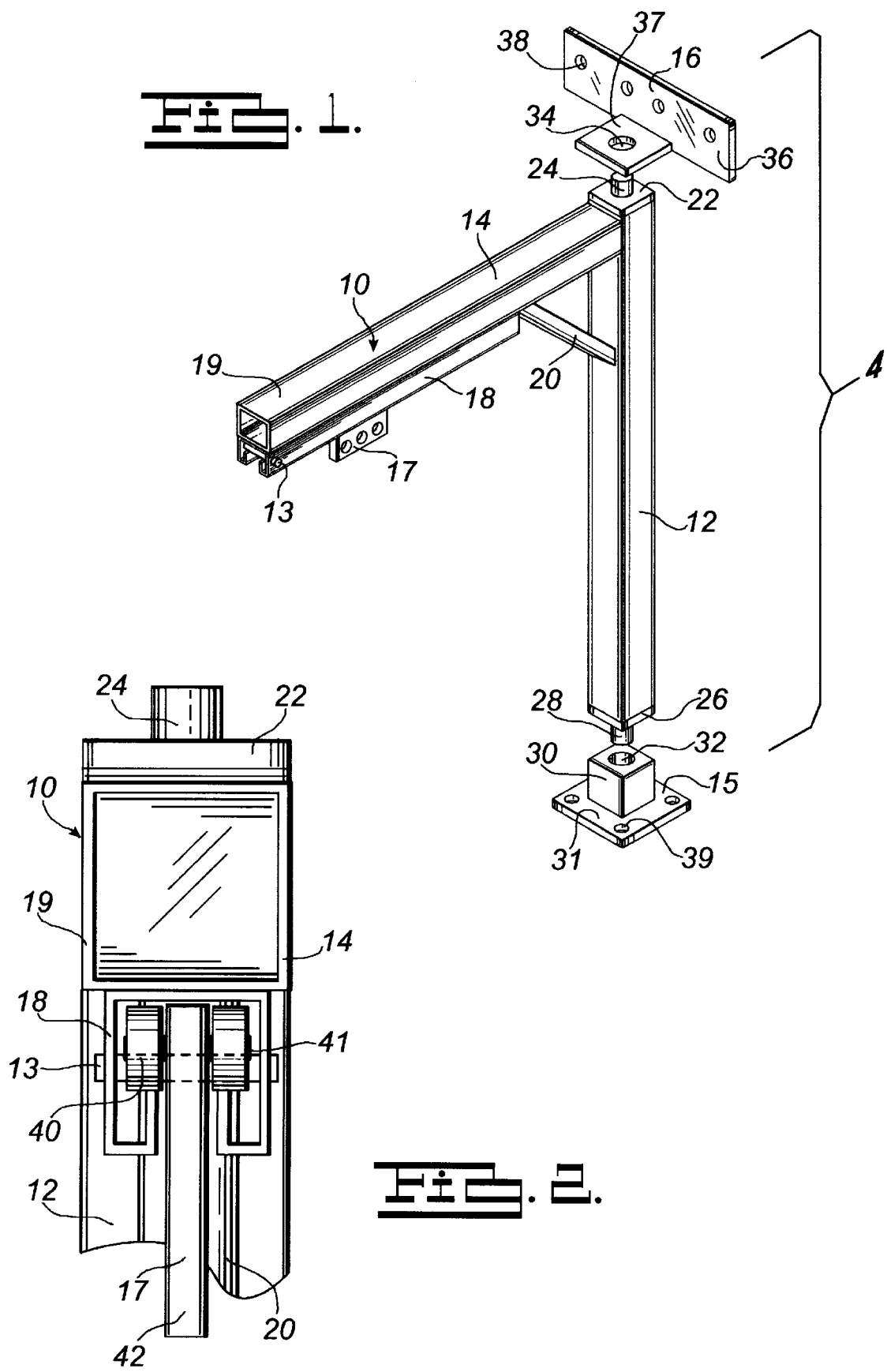

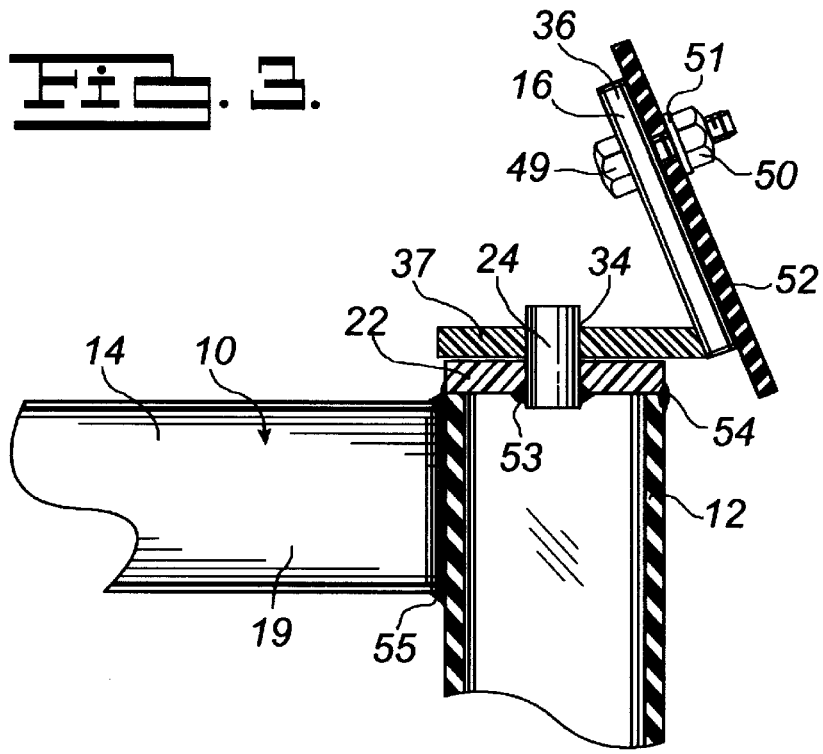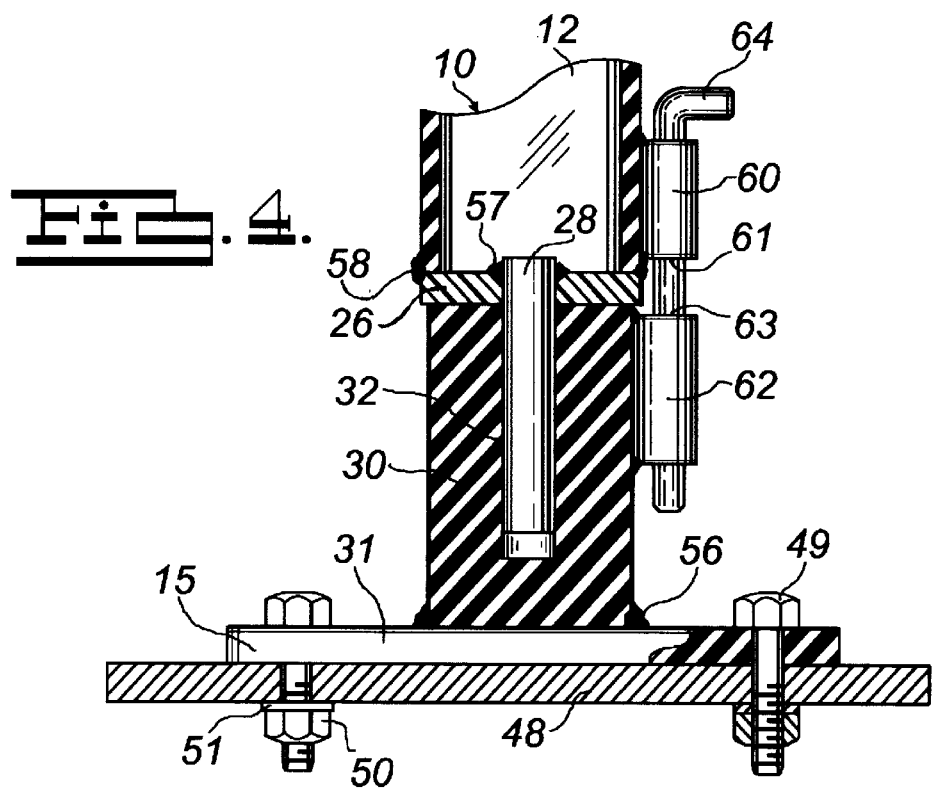

PORTABLE JIB CRANE FOR PANEL TRUCKS

BACKGROUND OF THE INVENTION

The following invention relates in general to portable jib cranes, and more particularly to those jib cranes having a rotating mast between opposing pivot points.

There are many examples of jib cranes widely seen in the art to which the present invention pertains. These jib cranes vary in size from industrial uses to lightweight portable models used to lift motors from automobiles. While the current array of jib cranes are well suited for their intended purpose, there are many instances where they fall short in their ability to meet the needs of the user. In the most common practice, a jib crane has a mast and a boom. The boom is fitted with a lifting apparatus which allows one to attach lifting tackle to a heavy object, lift the object and allow re-location of the object.

As the present invention pertains to portable cranes, the type commonly associated with service repair trucks, the pertaining problems increase. Service repair trucks, usually fitted to a 1 ton chassis, comprise most of the equipment needed to repair on location. In many situations, the need to lift heavy parts into or out of the service truck is a common occurrence. As these service vehicles have open cargo beds, the cranes for the most part are able to meet these general lifting needs.

Another form of the service repair truck comprises a van body situated onto a heavy duty chassis. The advantages of the van, having an enclosed payload area, allow for protection from the elements, as well as security from theft. Most of these vans are of the same class as leisure/recreational vehicles therefore allowing for travel and parking anywhere, a convenience not available to other aforementioned service trucks. One advantage the open bed service trucks have on the van body type is the ability to lift and load objects to and from the bed without interferrence from side walls found with vans. The availability of lifting equipment is much greater for open bed trucks, wherein no such equipment is designated for use with vans, that is until the present invention.

In light of the numerous jib cranes widely seen in the art, no real consideration has been given in designating a crane for use with a van until the present invention. A typical practice whereby a jib crane would be used with a van would encompass one opening the rear swing-out doors of the van, rotating a boom/mast out of the van, sliding a lifting trolley over an intended payload and lifting the payload into the van by reversing the above steps. There are some jib cranes that claim this practice while being mountable within a van. These cranes all have a single axis point at the planar floor level and without a counter means to off-set the weight of a heavy object, would fail upon repetitive use. Those cranes which could bear the load are to heavy and cumbersome for use with the common van service vehicle.

Therefore having described the shortcomings of jib cranes with respect to usage with a van truck, a main object of the present invention is to provide a jib crane having a slidable lifting trolley along the jib member while being rotatably fixed between opposing axle points.

Another object of the present invention is to provide a a rotational jib crane, having a transversing trolley adapted for use with a lifting apparatus, for use with larger service trucks having an enclosed van body.

While it is yet a further object of the present invention to provide a rotating jib crane adapted for close placement to the perimeter of the cargo opening thereby preventing obstruction from objects entering or leaving the cargo area.

SUMMARY OF THE INVENTION

To fulfill the above-mentioned objects of the present invention, there is provided a rotational jib crane having a transversing trolley member adapted for use with a lifting or hoisting apparatus. The main embodiment of the present invention is fabricated from a plurality of metal plates, tubes, channels and rods welded together by placing the various components into a jig fixture and applying the appropriate welds.

The embodiment first comprises a mounting base plate which is fitted to the floor of the van and secured there by drilling through the floor and inserting nuts and bolts through the base plate and floor. The base plate has a bearing pin extending upward which communicates with an aperture located in the lower end of the mast. The upper mounting plate is adapted for fixed communication with an inner stress beam extending along the upper end area of the van, wherein a plurality of bolts extend through the plate and beam and tightened there with lock washers and nuts. The upper mounting plate has a bearing pin extending downward for rotational communication with the top area of the mast, wherein the upper and lower bearing pins are in plumb alignment having the mast rotational there between.

Extending outward from the upper area of the mast is a jib member which is welded in place. The jib is sufficient for rotational movement from 0 degrees (the point furthest inward of the van), to 180 degrees (the point extending out from the van). To prevent metalurgic stress to the jib, a strut is welded to the mast and jib member. Situated below the jib and extending from the strut to the end of the jib, is a channel member which is welded to the under surface of the jib. The channel has a trolley member which is adapted for sliding communication along juxtaposed flanges comprising the terminal ends of the channel. The trolley has a plate comprising a plurality of apertures for communication with the hardware of any given lifting apparatus common to the art and not described here.

Once installed between the upper and lower mounting plates, the rotating mast and extending jib are symetrically fixed so as to remain inconspicuously neutral to the loading and unloading area of the van, which is limited to the area revealed upon opening both rear van doors.

In practice, one positions the vehicle in close proximity to the heavy object. The rear doors are swung outward and the crane rotated to a point where the jib is over the object. A lifting apparatus is then fixed to the trolley and the tackle attached to the object. After elevating the object to a point above the planar level of the cargo bed floor, the user rotates the mast until the object is within the van. the object then in lowered to the floor and the doors are then shut.

BRIEF DESCRIPTION OF THE DRAWINGS

In the drawings, where like reference numerals are used to indicate identical components in the various figures:

FIG. 1 is a perspective view of the preferred embodiment of the present invention exploded into the main components as shown in Bracket 4.

FIG. 2 is a fragmentary perspective view of the boom assembly and further depicts the trolley and upper pin member of the main embodiment.

FIG. 3 is a fragmentary perspective view, taken in partial cross-section, of the upper rotational region of the main embodiment.

FIG. 4 is a fragmentary perspective view, taken in partial cross-section, of the lower rotational region, and further depicting the locking means.

DETAILED DESCRIPTION OF THE EMBODIMENTS

Figure 5:
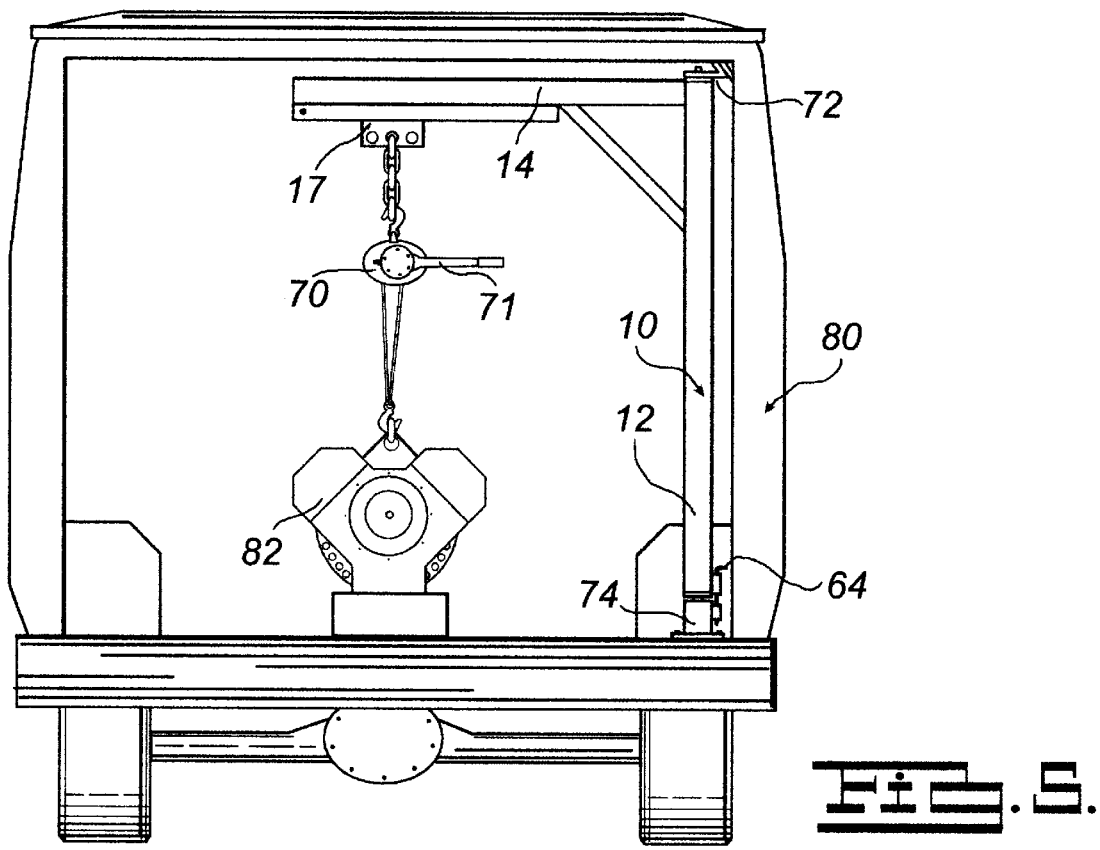
FIG. 5 is a perspective view of the preferred embodiment as attached to a typical service van, and further shows a common lifting apparatus with a payload.

With reference to all the drawing figures, the invention is generally denoted by the numeral 10.

In FIG. 1, the preferred embodiment 10 comprises a mast 12 and a boom assembly 14. The mast 12 has a top plate 22 which is adapted for a register pin 24 which extends through the plate 22 and is welded thereto. The top plate 22 is welded to the upper termination of the mast 12 while a bottom plate 26 has a registration pin 28 extending downward and is welded to the lower terminal end of the mast 12. The lower pin 28 is adapted for rotational communication with a race 32 extending through a journal box 30 which is welded to a base plate 31 comprising the lower mounting assembly 15. The upper mounting assembly 16 has a tab 37 extending outward from a side plate 36. The tab 37 has a bearing race 34 adapted for communication with the upper register pin 24.

Fixed to the upper end of the mast 12 is a boom assembly which comprises a jib 19 welded to the mast 12. Located along the under surface of the jib 19 is a channel 18 adapted to receiving a trolley assembly 17 therein. The jib 19 has a strut 20 and is welded from the jib 19 to the mast 12. Located in the lower mount assembly 15 and the side plate 36 of the upper mount assembly 16 are mounting apertures 39 and 38 respectively. The trolley assembly 17 is captive within the channel 18 by the strut 20 and a friction pin 13 extending through the outward termination of the channel 18.

As seen in FIG. 2, the invention 10 has a mast 12 having a top plate 22. The top plate 22 has a register pin 24. Situated below the top plate 22 is a boom assembly 14 comprised of a jib 19 welded to the mast 12, a channel 18 welded to the jib 19 and a strut 20 welded both to the jib 19 and the mast 12. Located in the channel 18 is a trolley assembly 17 which further comprises a plurality of wheels 40, an axle 41 and a plate 42. A friction pin 13 is press fitted through the terminal end of the jib and prevents the trolley 17 from dislodgment from the jib 19.

In FIG. 3, the fragmentation of the preferred embodiment 10 depicts the rotational communication between the mast 12 and the upper mount assembly 16. Extending at a right angle from the mast 12 is a boom assembly 14 comprising a jib member 19 which bears the weight of a payload. The mount assembly 16 has tab 37 extending outward from a plate 36 wherein the tab has a race 34 which communicates with a register pin 24 extended through a top plate 22. The upper mount assembly 16 is ridgidly fixed to the cross-beam 52 of a panel truck, wherein holes are drilled through the upper mount 16 and cross-beam 52 and bolts 49, lock washers 51 and nuts 50 are used to hold the components thereto.

Referring now to the mast 12, wherein the top plate 22 is receivable of a pin 24 which is fixed to the plate 22 by a weld 53. The top plate 22 is fixed to the mast by a weld 54, while the jib 19 fixed to the mast 12 by a weld 55.

As seen in FIG. 4, the fragmentation of the invention 10 in rotational communication with a mast 12 and the lower mount assembly 15. The mast 12 has a plate member 26 attached by means of a weld 58 and has a cylindrical register pin 28 extending there from and held by a weld 57. The pin 28 is adapted for rotational communication with a race 32 which is centrally positioned in a journal box 30 welded to the base plate 31 of the mount assembly 15, wherein the weld is further denoted as 56. The base plate 31 is fixed to a vehicular substrate 48 by bolts 49, lock washers 51 and nuts 50. To prevent rotational movement during periods of non-use of the invention, a locking assembly 60 has a plurality of tubular members 62 in alignment, one fixed to the mast 12 and one fixed to the journal box 30, wherein a pin 64 is inserted through a first top hole 61 and a second bottom hole 63.

In FIG. 5, the invention 10 is fixed rotational to a panel truck 80 by the upper mount assembly 72, and the lower mount assembly 74. The rotational movement can be fixed to a single orientation using a pin 64. In practice, one extends the trolley 17 center of a payload 82 and using a common lifting apparatus 70 hoist the payload 80 using the handle 71. Once lifted, the user moves the boom 14 manually causing the mast 12 to rotate out from the vehicle 80.

Figure 6:
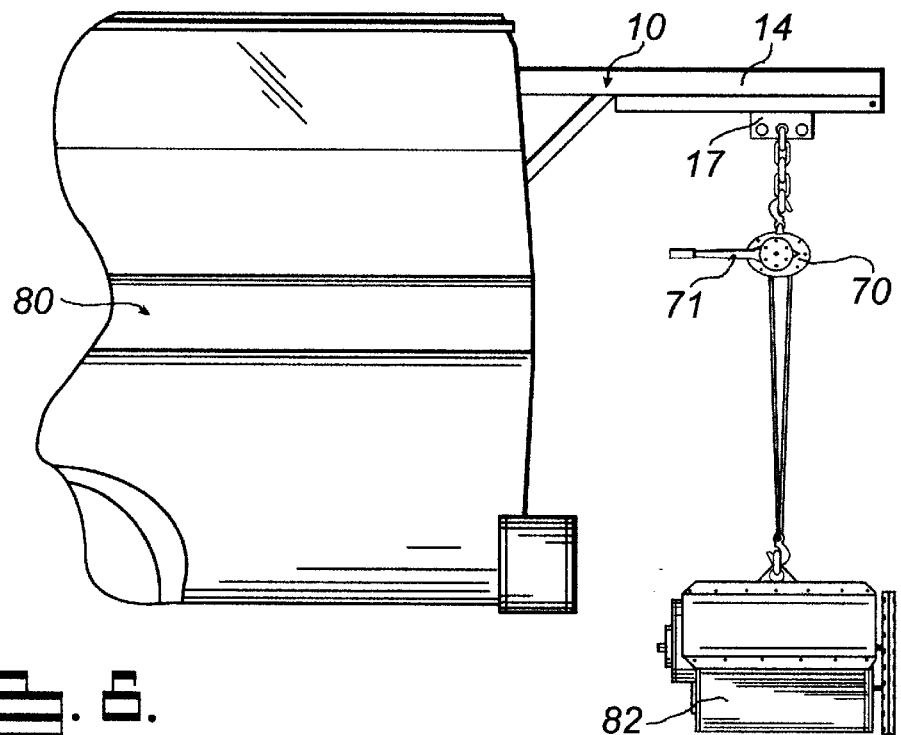
FIG. 6 is a fragmentary perspective view of the main embodiment, wherein the payload has been lifted from the vehicle, swung out the rear opening, and is being lowered to the ground.

Now referring to FIG. 6, wherein the boom assembly 14 is extended from the vehicle (rear doors not shown). The trolley assembly 17 of the invention 10 is moved outward along the boom 14 and a lifting apparatus 70, having a handle 71, lowers a payload 82 to the ground.

While the foregoing embodiments of the present invention are well suited to achieve their above-stated objects, those skilled in the art should realize that such such objects are subject to modification, alteration and change without departing from the spirit and scope of the present embodiments. For example, the embodiments seen herein could easily adapt through slight design changes to fit any particular vehicle having a rectangular cargo door. As another example, the mast of the preferred embodiment could be fitted with an articulating arm which would increase the total lifting capacity of the present invention.

Other variations will no doubt occur to those skilled in the art upon the study of the text and drawings contained herein. Accordingly, it is to be understood that the present invention is not limited to the specific embodiments described herein, but should be deemed to extend to the subject matter defined by the appended claims, including all fair equivalents thereof.

What is claimed is:

1. An apparatus for use within an enclosed cargo area of a motor vehicle, the apparatus comprising:

a vertically extending mast supporting a horizontally extending jib, the jib comprising a unitary beam supporting a channel which extends to the distal end of the beam along underside of thereof, the channel comprising an upper wall, opposing side walls, and an undersurface having a central opening extending a long the length of the channel, the channel defined by upward extending terminations having upper surfaces;

opposing upper and lower bearing and race assemblies attached to the jib for rotational movement of the mast and the jib, including upper and lower mounting means for mounting the bearing and race assemblies within the motor vehicle;

a trolley member traversable in the channel, the trolley member comprising a plate, a plurality of rollers which ride along the upper surfaces of the channel terminations, and roller axles which extend through the plate and which are supported by bearings;

means for hoisting a load supported by the trolley member; and means for fixing the rotational position of the of the mast and the jib.

2. The apparatus as recited in claim 1, wherein the channel is attached along the underside of the unitary beam by continuous welds.

3. The apparatus as recited in claim 1, wherein the channel has a steel friction pin extending therethrough at the distal end defining a stop for the trolley member.

4. The apparatus as recited in claim 1, wherein the unitary beam is attached to the upper end of the mast by welding.

5. The apparatus as recited in claim 1 further comprising a strut member welded to the underside of the jib at a 45 degree angle extending downward to the mast and is welded thereto.

6. The apparatus as recited in claim 1, wherein the upper mounting means comprises a mounting plate adapted to be fastened to a cross-beam of the motor vehicle, the mounting plate having an outwardly extending tab, with the tab having a central aperture which defines the upper race of the upper bearing and race assembly, and wherein the lower mounting means comprises a base plate having a plurality of bolt holes for attachment to a lower surface of the vehicle and a journal box extending upwardly from the plate, with the upper surface of the journal box having a central aperture which defines the lower race of the lower bearing and race assembly.

7. The apparatus as recited in claim 6, wherein the means for fixing the rotational position of the mast and the jib comprises a first pilot tube welded to the side of the mast at its lower end, and extending vertically along the long axis of the mast, a second pilot tube welded to the journal box and alignable with the first pilot tube, and a pilot pin extendable into the first and second tubes.

8. The apparatus as recited in claim 1 wherein the mast comprises a unitary beam and the jib is welded to the upper end of the beam, wherein the mast further comprises an upper plate welded to the upper end of its unitary beam with an upper bearing pin welded through the upper plate, the upper bearing pin defining the bearing of the upper bearing and race assembly, and the mast further comprises a lower plate welded to the lower end of its unitary beam with a lower bearing pin welded through the lower plate, the lower bear pin defining the bearing of the lower bearing and race assembly.

* * * * *